UNITED STATES PATENT OFFICE.

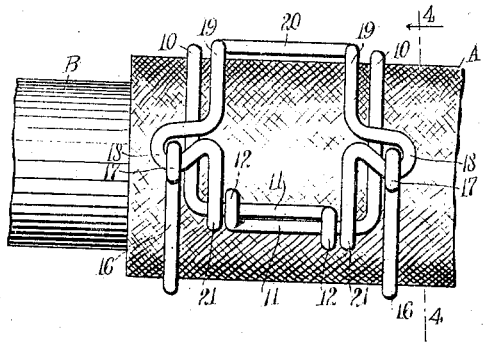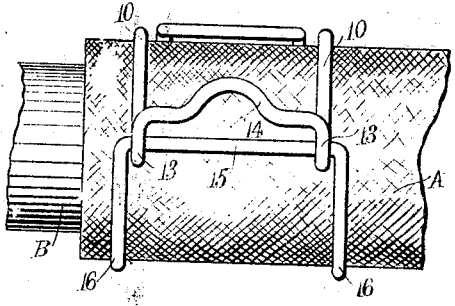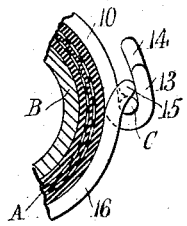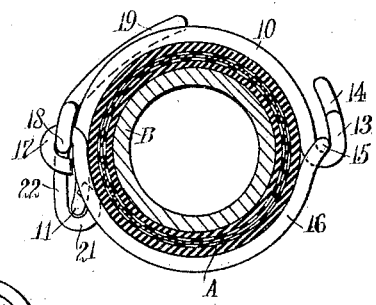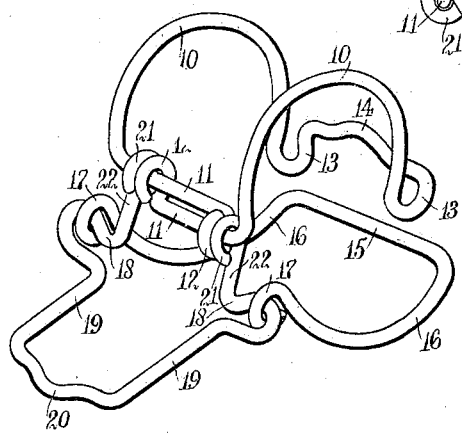

HAROLD R. FRANCIS, OF ROCKFORD, ILLINOIS, ASSIGNOR OF ONE-HALF TO C. A. ROBERTSON, OF ROCKFORD, ILLINOIS.

HOSE-CLAMP.

996,478.

Specification of Letters Patent.   Patented June 27, 1911.

Application filed October 19, 1910.   Serial No. 587,887.

*To all whom it may concern:*

Be it known that I, HAROLD R. FRANCIS, a citizen of the United States, and a resident of Rockford, in the county of Winnebago and State of Illinois, have invented a new and Improved Hose-Clamp, of which the following is a full, clear, and exact description.

Among the principal objects which the present invention has in view are: to provide an apparatus of the character described, constructed and arranged to provide a lever for contracting the holding loop; to provide an expansible and contractible hose holding loop with means connected therewith for exerting the necessary contracting pressure; to provide means for contracting the clamp and automatically locking the same in contracted position; and to provide a clamp of the character described the construction whereof is simple, economical and durable.

One embodiment of the present invention is disclosed in the structure illustrated in the accompanying drawings, in which like characters of reference denote corresponding parts in all the views, and in which—

Figure 1 is a side view of a clamp constructed and arranged in accordance with the present invention, shown in conjunction with a pipe hose section, and in locked relation thereto; Fig. 2 is a similar view taken from the opposite side of the clamp; Fig. 3 is a perspective view of the clamp, the same being shown in the open position; Fig. 4 is a cross section of a hose pipe having applied thereto, and in closed position, a clamp of the construction herein described, the section being taken on the line 4—4 in Fig. 1; and Fig. 5 is a detail view of the looped ends of the clamp, showing in conjunction therewith a device for compensating for the wear of the parts of the clamp or the hose pipe.

The clamp shown in the accompanying drawings is preferably constructed from wire of any suitable gage. The clamp consists of three distinct but operatively connected members or parts. The main loop section is formed from a single piece of wire, bent to form two half circle sections 10, 10, curved to substantially the circumference of the hose pipe. The sections 10, 10 are connected by cross bars 11, 11 formed from the end sections of each of the half circle sections 10, 10. The bars 11, 11 are disposed in parallel relation and have each formed in the end thereof an eyelet or loop 12, 12. Each of the eyelets 12, 12 encircle in holding relation the opposite bar 11.

At the opposite ends of the circle sections 10, 10 there are formed hooks 13, 13. The hooks 13, 13 are connected by a cross bar 14, which cross bar extends between the open ends of the hooks 13, 13.

The sections herein termed hooks 13, and the cross bar 14, constitute a single hook member under which is passed the latch bar 15 of the opposite loop section which forms the clamp to encompass the hose pipe. The loop section having the latch bar 15 is provided with half circle sections 16, 16, at the ends whereof are formed closed eyelets 17, 17. The eyelets 17, 17 form hinge joints with short bars 18, 18 formed on the lever member which connects the said loops.

The lever member having the short bars 18, 18 is provided with a square frame section having lever arms 19, 19 which are joined across the outer ends by a cross bar 20. The frame formed by the arms 19 and the cross bar 20 constitute the handle for operating the lever. This lever is of the second order, and is fulcrumed on the cross bars 11, 11 of the half circle sections 10, 10, as best shown in Fig. 3 of the drawings. The lever is connected to the said cross bars 11 by means of loose eyelets 21, 21.

The parts in their relaxed position are disposed substantially as shown in Fig. 3 of the drawings. To form a hose connection with clamps constructed as described, the parted ends of the hose pipe A are placed over a suitable metal tubing B, substantially as shown in Figs. 1 and 2. The loops formed by the half-sections 10, 10 and 16, 16 are spread, and extended over the hose pipe. The free ends of the hose pipe are then brought together, and the latch head 15 is passed over and under the cross bar 14 and the hooks 13, 13. The link-like connection produced by the straight sections 22, 22 of the lever provide slack enough in the clamp to permit the loops to be thus joined. The lever is now moved toward the loop having the half sections 10, 10. This movement of the lever draws the half sections of the clamp into closer relation, the circumference of the combined members being diminished by twice the length of the straight sections 22. When the cross bar 20 and arms 19 of the lever are finally forced over from the position shown in Fig. 3 of the drawings, the eyelets 17 formed on the sections 16 are disposed between the cross bars 11 and the hooks 13, as best seen in Fig. 4 of the drawings.

When the lever is disposed in the position shown in Figs. 1 and 4 of the drawings the line of the pull of the sections 16 and 10 on the joints formed by the straight sections 22 passes inside the pivotal connections, thereby locking the loops in close relation.

When it is desired to release the hose sections from the engagement of the clamp, any suitable instrument may be placed below the cross bar 20, and the lever may be pried upward until the lock due to the expansion of the loops and the hose pipe is broken. When the strain is taken off the lock the lever may be readily and easily moved to the fuller relaxed position shown in Fig. 3 of the drawings.

In Fig. 5 of the drawings I have illustrated a simple method of taking up any slack which might arise from use in the clamp, or due to compacting the body of the hose pipe. The method referred to consists in inserting a suitable small bit of wire C between the extensions of the loops 13, 13. Any suitable filling bit or piece could be thus employed.

Having thus described my invention, what I claim as new and desire to secure by Letters Patent is:—

A hose clamp, comprising a half loop section having side members disposed in separated relation, said side members being united by a cross bar arranged to form a hook for the said half loop, the ends of said half loop being lapped and coiled each upon the straight bar of the other end portion to form a cross bar; a second half loop section the side members whereof are separated a distance greater than the distance between the said side members of the first mentioned half loop section, and connected by a latch bar, the free ends of said second half loop section being bent to form hinge eyelets; and a lever having a handle extension the sides whereof are separated to less than the distance between the side members of said first mentioned loop section, said lever having formed at the end thereof hinge eyelets pivotally connected with the cross bar of said first mentioned loop section, the side members of said lever being bent to form hinge bars passing through the eyelets formed in the ends of the said second loop section, the said hinge bars and hinge eyelets forming the said lever being separated to form a contracting section.

In testimony whereof I have signed this specification in the presence of two subscribing witnesses.

HAROLD R. FRANCIS.

Witnesses:
CHARLES A. ROBERTSON,
W. H. TOMLINSON